July 13, 1954  O. C. WILSON  2,683,415
ROCKET MOTOR
Filed Aug. 13, 1945
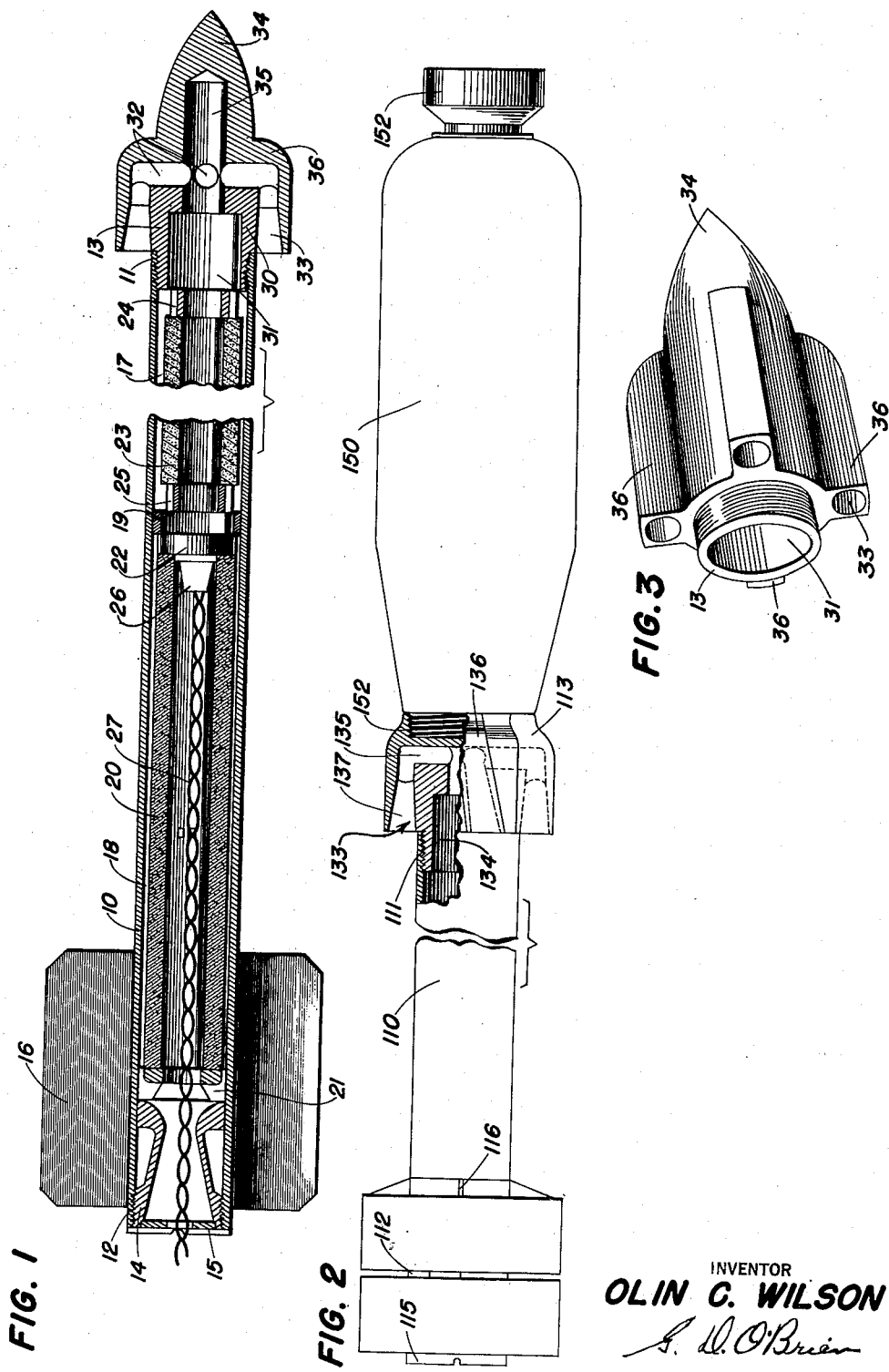
INVENTOR
OLIN C. WILSON
ATTORNEY Patented July 13, 1954

2,683,415

UNITED STATES PATENT OFFICE 2,683,415

ROCKET MOTOR

Olin C. Wilson, Pasadena, Calif., assignor to the United States of America as represented by the Secretary of the Navy Application August 13, 1945, Serial No. 610,652

1 Claim. (Cl. 102—49)

This invention relates to rocket missiles, such as rocket projectiles, rocket bombs and the like, and has particular relation to rocket motors for use therewith.

Conventional rocket motors used for jet propelling projectiles, bombs and the like generally comprise a cylindrical motor tube containing a propellent charge, an igniter for initiating combustion of the propellent and exhaust nozzle means mounted at the rear end of the motor tube for releasing the products of combustion under pressure, thereby propelling the rocket in a direction opposite to the flow of exhaust gases. Rocket motors of this type have the disadvantage that the quantity and size of the propellent charge is limited by the effective throat area of the exhaust nozzle means.

In the construction of high performance rocket motors employing propellent grains, as the propellent grain is increased in volume, the nozzle diameter may be increased so as to give a constant ratio of burning area of the propellent grain to throat area of the nozzle. However, the value of the ratio of burning grain area to the cross-sectional internal port area within the motor tube increases steadily with increase in grain length and experiments have shown that rocket motors are unsuccessful if the latter ratio is greater than approximately 75% of the former ratio. The cross-sectional internal port area is defined as the radial cross-sectional area within the motor tube not occupied by the propellent grain. One cause of failure of high performance rocket motors is the formation of excessive pressure within the motor tube caused by decreases in the cross-sectional internal port area within the motor tube due to cross-sectional area increases in the grain. When a rocket is fired, the force of setback acting on the propellent grain causes it to be compressed along its length, thereby increasing the cross-sectional area, particularly along the rear end portion of the grain. Another cause of failure is excessive heating of the motor tube due to the generation of peak pressures of hot gases which cannot be immediately vented through the exhaust nozzle. By use of the present invention, the abovementioned difficulties may be obviated.

In accordance with the present invention there is provided a rocket motor of novel construction which comprises a motor tube having rearwardly directed exhaust means mounted forward of the rear end portion of the motor tube, including passage means communicating with the motor tube. The rearwardly directed exhaust means may be mounted along the length of the motor tube and is preferably mounted at the forward end portion of the motor tube. The rearwardly directed exhaust means of the present invention may be used as the sole exhaust means, or it may be used in combination with conventional rear end portion exhaust nozzles, or a plurality of rearwardly directed exhaust means of the present invention may be employed along the length of the motor tube.

An object of the present invention is to provide a rocket motor which will permit the use of a longer and increased volume of propellent charge than has heretofore been possible for a given size of rocket motor, and which will minimize the possibility of deterioration or other damage to the propellent charge due to the rapid acceleration of burning, and the attendant possibility of erratic burning.

Another object of the invention is to provide a rocket motor which will permit the discharge of a greater volume of gas from the motor tube without exceeding the allowable maximum velocity of burning gases than has heretofore been possible.

Another object is to provide a rocket motor which will have a low internal gas velocity thereby decreasing the effective heat transfer from the hot exhaust gases to the motor tube.

Another object is to provide a rocket motor which will permit a shortened travel of combustion gases within the motor tube thereby decreasing the friction loss due to the travel of gas within the tube.

Another object is to provide a rocket motor which has particular use with high velocity, long range rocket devices which will maintain a predetermined trajectory due to the reduced burning time of a given size propellent grain.

Another object is to provide a rocket device having a decreased dispersion due to all or part of the thrust being applied at the center of gravity of the rocket missile.

Another object is to provide a rocket device having rearwardly directed exhaust means mounted at and communicating with the forward end portion of the rocket motor located at the center of gravity of the rocket device, whereby to improve the flight characteristics thereof.

Another object is to provide a rocket motor having helically disposed, rearwardly directed exhaust means mounted forward of the rear end portion of the motor tube, preferably at the center of gravity of the rocket device, whereby to improve the flight characteristics of the rocket.

These and other objects of the invention will be better understood by reference to the accompanying description and drawing in which:

Fig. 1 is a longitudinal sectional view of a high speed, long range rocket incorporating the present invention;

Fig. 2 is an elevational view of a barrage or bomb driving rocket with the rearwardly directed exhaust means of the present invention shown partly in cross-section; and Fig. 3 is a perspective view of the forward, rearwardly directed exhaust means shown in Fig. 1.

Referring to the drawing, the rocket device shown in Fig. 1 comprises a motor tube 10 having a forward exhaust end portion 11 and a rear exhaust end portion 12. A forward exhaust nozzle unit 13 is mounted on the forward end portion 11 and a rear exhaust nozzle unit 14 is mounted on the rear end portion 12. A base plate 15 is secured to the rear end portion 12 to protect the nozzle 14 and the contents of the motor tube 10 during handling and shipment. Radial fins 16 are secured to the outer rear end portion of the motor tube in order to impart stability to the rocket during its flight.

The interior of the motor tube is divided into a forward compartment 17 and a rear compartment 18 by an internal center flange 19. A cylindrical propellent grain 20 is mounted in the rear compartment by means of a rear spacer grid 21 and a rear center spacer grid 22. The forward propellent grain 23 is positioned in the forward compartment 17 by means of a forward spacer grid 24 and a forward center spacer grid 25. An igniter 26 mounted on the grid 22 is connected to a source of electrical current (not shown) by means of ignition wires 27.

The rearwardly directed nozzle unit 13 is provided with an externally screw threaded socket 30 which is adapted to be screwed into the forward end portion 11 of the motor tube. The interior of the nozzle unit 13 has a socket chamber 31 leading into radial exhaust passages 32 communicating with the rearwardly directed nozzles 33. The unit 13 terminates at its forward end in a projectile shaped nose 34 having an internal cavity 35. The cavity 35 may be used as an exhaust gas chamber or it may be separated from the radial exhaust passages 32 by a suitable steel plug and filled with an explosive and a fuze (not shown). The outer ends of the passages 32 and the nozzles 33 are contained in the bosses 36.

In operation, the propellent grains 20 and 23 are ignited simultaneously by means of the igniter 26 which is electrically fired by the passage of current through the ignition wires 27. The flash from the igniter ignites the propellent 20 in the rear compartment 18 and passes through the opening in flange 19 igniting the propellent 23 in the forward compartment 17. The propellent grains burn along their surfaces, designated portions of which may be inhibited from burning by inhibitor means such as described in co-pending application serial No. 613,764 filed on September 26, 1945. The burning gases, which generate temperature and pressure of high order, pass along the rear compartment 18 toward the rear exhaust nozzle 14 and pass along the forward compartment 17 toward the forward nozzle unit 13. The free area through which the gases pass along the length of the motor tube is known as the internal port area, which is the cross-sectional area within the motor tube not occupied by the propellent charge. It will be apparent that as the surface of the propellent grain burns away, the internal port area is increased, thus permitting the flow of a greater volume of gas at a lower velocity. After passing rearwardly through the rear compartment and forwardly through the forward compartment, the gases are discharged through the throat of the rear nozzle 14, the base plate 15 being removed before firing of the rocket, and forwardly through the socket chamber 31, radially through the exhaust passages 32 and rearwardly through the throat of the nozzles 33.

It will be apparent that the volume and rate of flow of the exhaust gases are partially determined by the throat area of the exhaust nozzles. Due to the flow of gases within the motor tube, the pressure is highest at the center of the motor tube and lowest at the forward and rear extremities thereof. Therefore it will be apparent that the pressure difference between the center and the extremities of the motor tube is virtually only half of the pressure differential that would exist if the same total length of propellent were used and the resultant gases were discharged from the rear nozzle only. Furthermore, since both the forward propellent charge and the rear propellent charge are ignited simultaneously the burning time of the rocket motor is substantially one-half of that which would be required if only one grain and one igniter positioned at one end thereof were provided. The rocket projectile shown in Fig. 1 may be spin-stabilized; that is, it may be caused to rotate about its longitudinal axis during flight, by spirally directing or canting the nozzles 33. Spinning of the rocket may also be accomplished by providing the rear exhaust end 12 with a canted exhaust nozzle arrangement, such as is shown in co-pending application, Ser. No. 564,337 filed, November 20, 1944. In the event that a spin-stabilized rocket projectile is desired, the fins 16 may be omitted.

As shown in Fig. 2, the present invention is also adapted for use in a rocket bomb or barrage rocket. The rocket bomb comprises a motor tube 110 having a forward end portion 111 and a rear end portion 112 in which is mounted a conventional exhaust nozzle (not shown) such as that shown in Fig. 1. A rearwardly directed exhaust nozzle unit 113 is mounted by screw thread arrangement in the forward end portion 111 of the motor tube. The nozzle unit 113 is substantially the same as that shown in Figs. 1 and 3; however, in place of the nose 34 shown in Fig. 1, screw thread means is provided for attachment to a bomb case 150. In this manner the nozzle unit 113 provides an adapter body for connecting the motor tube 110 to the bomb case 150. The nose of the bomb case is provided with a sleeve 152 for protecting the arming propeller of a nose fuze (not shown). The rocket device is preferably constructed so that the rearwardly directed exhaust unit 113 is at the center of gravity of the rocket device. In this connection it has been found that the positioning of the exhaust means at the center of gravity of the rocket missile greatly improves the stability thereof during flight. It will be understood that when a rear exhaust unit is mounted in the rear end portion 112, only a portion of the thrust is applied at the center of gravity by the rearwardly directed nozzle unit 113, but even this amount has an appreciable effect on increasing the stability and decreasing the dispersion characteristics of the rocket. The propellent charge (not shown) within the motor tube 110 may be of the design shown in Fig. 1, or it may comprise a single propellent grain, or the internal arrangement may be of any suitable construction.

It will be understood that the rearwardly directed nozzle means 13 and 113 of the present invention may be mounted at the forward end of the motor tube, at the center of gravity of the rocket device, or at any desired position along the length of the motor tube. Although in the drawing only one forward rearwardly directed nozzle unit is shown, it will be understood that a plurality of nozzle units may be employed along the length of the motor tube. Thus, the rocket projectile shown in Fig. 1 may be provided with a rearwardly directed nozzle unit between the forward compartment 17 and the rear compartment 18. While it is preferred to employ exhaust means at the rear end portion of the motor tube, it has been found that a rocket device employing the present invention will perform satisfactorily without the use of the rear end portion exhaust means.

I claim:

A rocket motor comprising a motor tube, a rear exhaust nozzle assembly secured in one end of said tube, a forward exhaust nozzle assembly secured in the other end of said tube and having exhaust passages extending radially from and in communication with the interior of said motor tube, said exhaust passages terminating in rearwardly directed nozzles, an annular flange member secured to the interior of said motor tube intermediate the length thereof, a forward pair of propellent grain spacers engaging respectively the inner end of said forward nozzle assembly and the forward end of said anular flange, an after pair of propellent grain spacers engaging respectively the inner end of said after nozzle assembly and the after end of said annular flange, a propellent grain fixedly disposed between each of said forward and after pairs of grain spacers, and an igniter mounted on one of said annular-flange-engaging grain spacers, the interior of said motor tube on one side of said annular flange being in communication with the interior of the motor tube on the other side of said annular flange whereby firing of said igniter will cause simultaneous ignition of both of said propellent grains.

References Cited in the file of this patent

UNITED STATES PATENTS

| Number | Name | Date |
|---|---|---|
| 2,206,809 | Denoix | July 2, 1940 |
| 2,398,927 | Farr | Apr. 23, 1946 |
| 2,404,190 | Pope | July 16, 1946 |

FOREIGN PATENTS

| Number | Country | Date |
|---|---|---|
| 11,705 | France | Oct. 5, 1844 |
| 1,734 | Great Britain | Apr. 24, 1876 |
| 503,006 | France | Mar. 6, 1920 |
| 503,166 | France | Mar. 10, 1920 |
| 139,856 | Great Britain | Mar. 18, 1920 |
| 166,583 | Great Britain | July 11, 1921 |
| 618,668 | Germany | Sept. 13, 1935 |
| 831,496 | France | June 7, 1938 |